United States Patent [19]

Knapp

[11] Patent Number: 5,592,971
[45] Date of Patent: Jan. 14, 1997

[54] SINGLE HANDLE MIXING VALVE WITH FLOW CONTROL DEVICE FOR PREVENTING HAMMER KNOCK

[75] Inventor: Alfons Knapp, Biberach/Riss, Germany

[73] Assignee: Masco Corporation, Taylor, Mich.

[21] Appl. No.: 500,853

[22] Filed: Aug. 4, 1995

[30] Foreign Application Priority Data

Feb. 26, 1993 [IT] Italy ................... TO93A0140

[51] Int. Cl.⁶ ............................................ F16K 11/065
[52] U.S. Cl. ................................ 137/625.41; 251/297
[58] Field of Search ..................... 251/297; 137/625.17, 137/625.4, 625.41

[56] References Cited

U.S. PATENT DOCUMENTS

| | | |
|---|---|---|
| 3,915,195 | 10/1975 | Manoogian et al. |
| 4,449,551 | 5/1984 | Lorch |
| 4,458,839 | 7/1984 | MacDonald |
| 4,505,301 | 3/1985 | Yang |
| 4,915,295 | 4/1990 | Pullen et al. |
| 4,941,509 | 7/1990 | Orlandi |
| 4,981,156 | 1/1991 | Nicklas et al. |
| 5,048,792 | 9/1991 | Fischer |
| 5,069,249 | 12/1991 | Ostertag et al. |

*Primary Examiner*—John C. Fox
*Attorney, Agent, or Firm*—Reising, Ethington, Barnard & Perry

[57] ABSTRACT

A mixing valve (10) has a control stem (22) for adjusting the movable ball valve (20) for controlling the flow rate and temperature mix of the mixed water. A spring clip (100) is mounted onto a rotatable disc member (70) retained on an upper fixed member (27). The plate member (70) has a slot (74) that receives the control stem (22) of valve element (20). The spring clip (100) has arms (102) with inwardly extending projections (114) that laterally engage the stem (22) to increase the operating force of the mixing valve when the mixing valve is at a preset flow position. The spring clip (100) rotates with the disc to cause no effect upon the temperature adjustment of the ball valve (20).

21 Claims, 6 Drawing Sheets

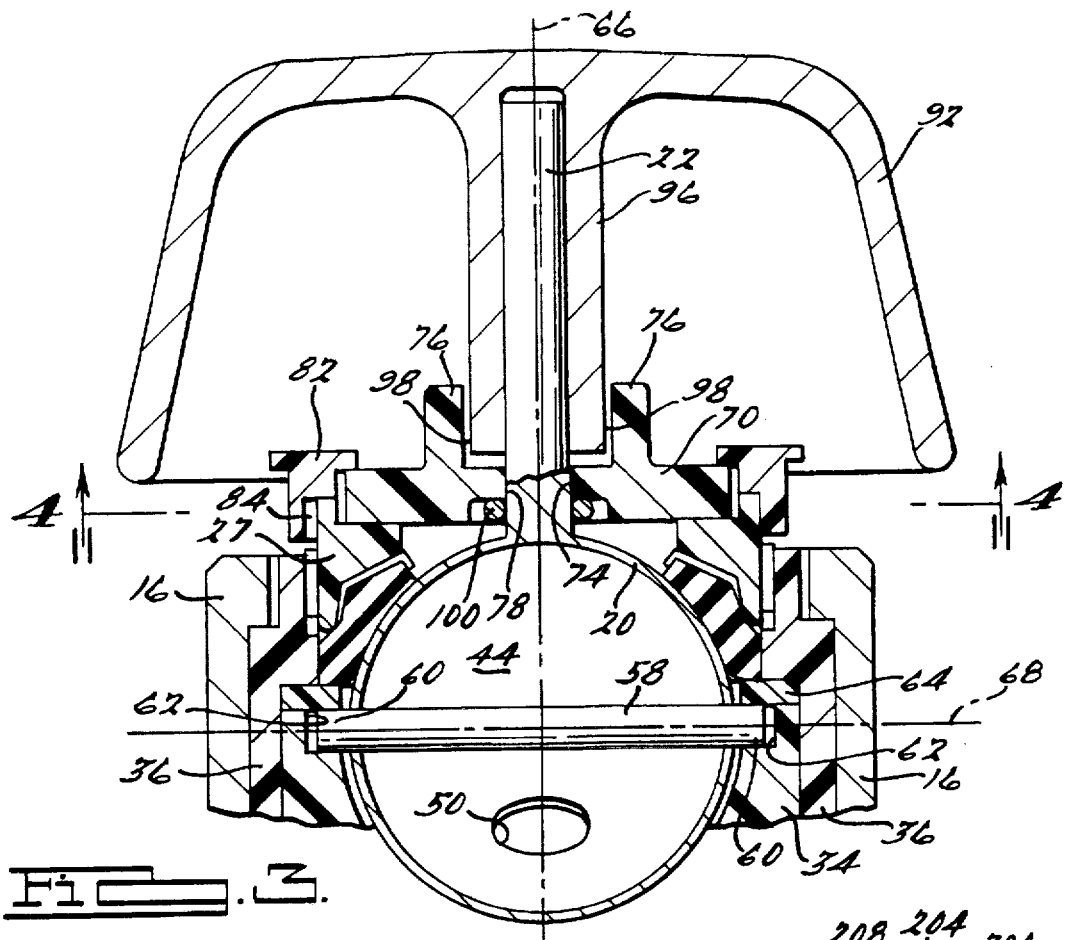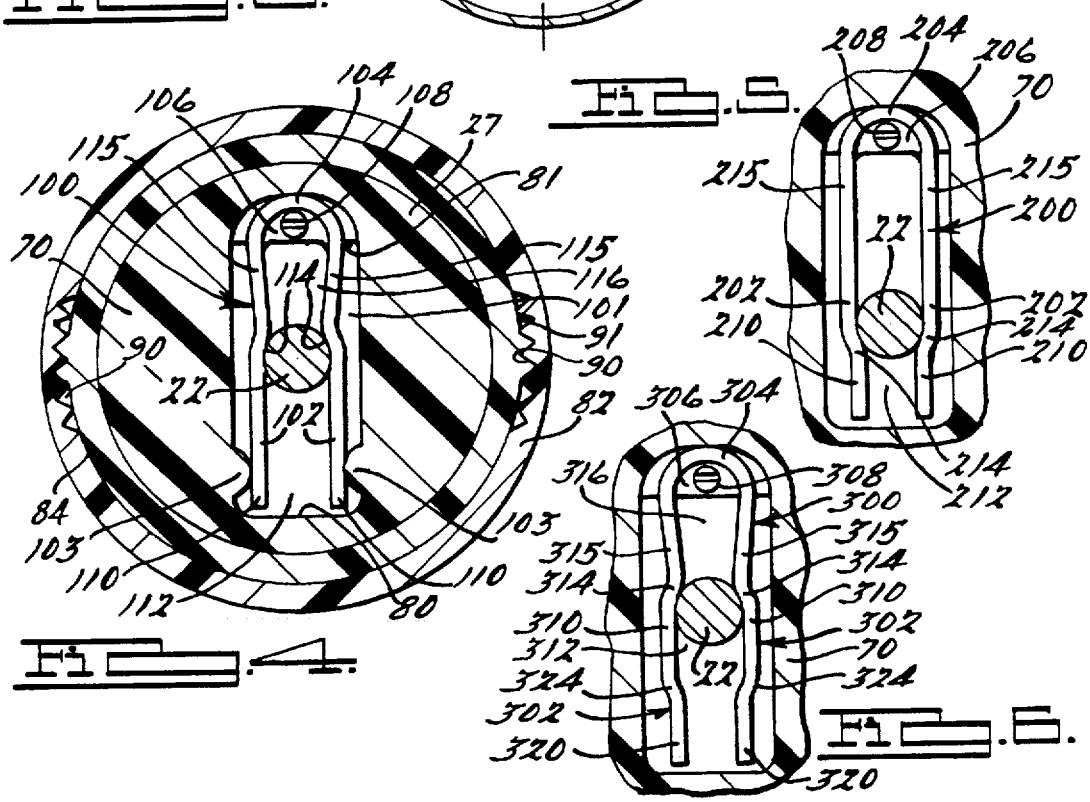

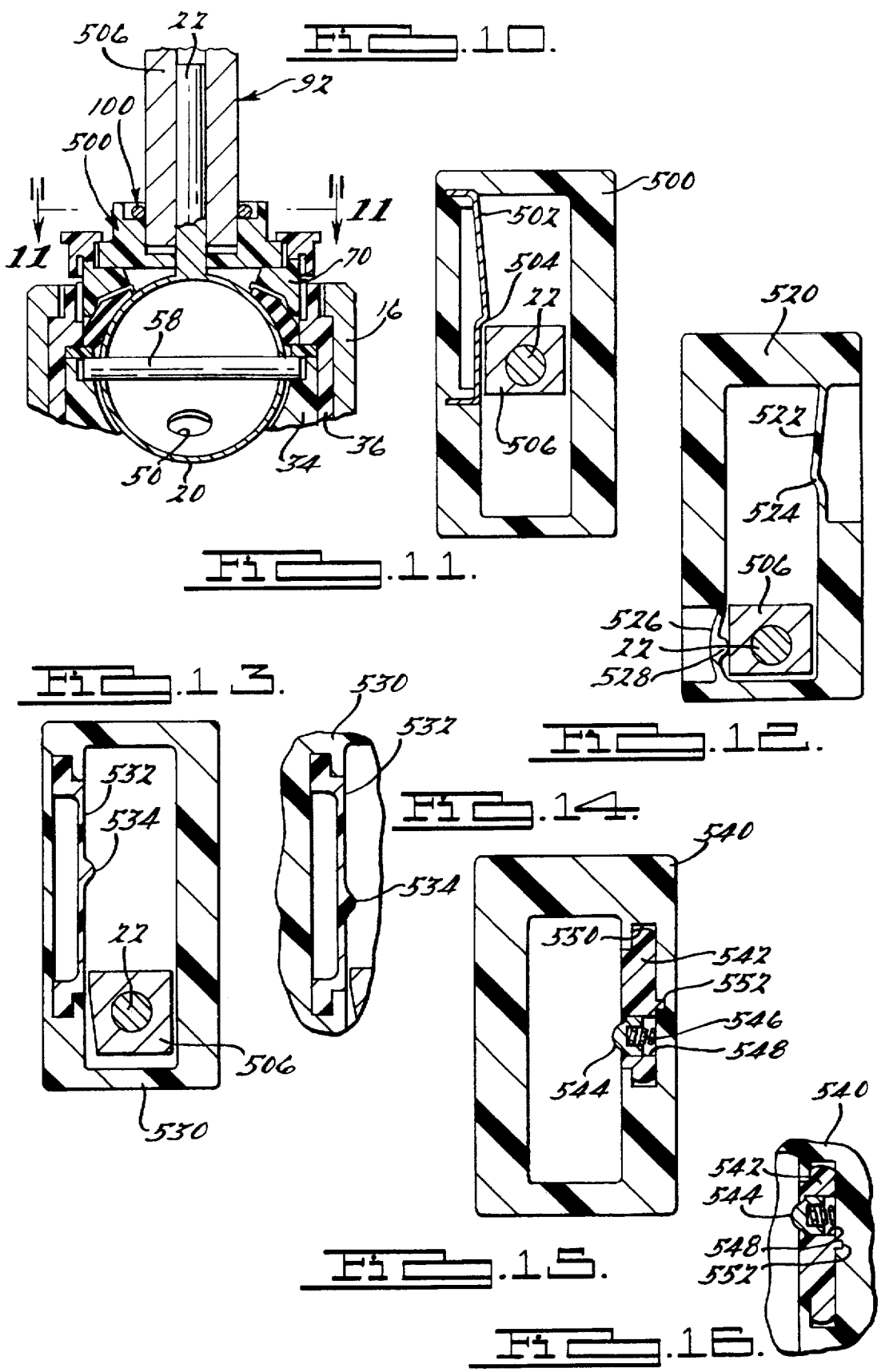

SINGLE HANDLE MIXING VALVE WITH FLOW CONTROL DEVICE FOR PREVENTING HAMMER KNOCK

TECHNICAL FIELD

The field of this invention relates to a faucet mixing valve and more particularly to a device that increases the operating force of the faucet mixing valve.

BACKGROUND OF THE DISCLOSURE

Single handle faucets, commonly referred to as mixing valves, that control the flow of both hot and cold water have seen vast consumer acceptance. The faucets are commonly constructed such that a handle or knob is movable in two distinct directions to adjust the mix of hot and cold water and to adjust the volume rate, i.e. flow.

The two basic types of mixing valves that have seen wide commercial acceptance are plate valves and ball valves. Ball valves are renowned for reliable and durable one piece valve construction that is easily assembled and easily repaired. Plate valves on the other hand offer a drive mechanism that allows motion of the handle in two distinct directions that has found widest commercial acceptance. This desirable handle motion allows for an orbiting motion of the handle about a fixed axis of the valve body and a rocking, i.e. pivoting motion about a axis that moves with respect to the valve housing as the handle orbits about the fixed axis. The moving axis is substantially perpendicular to the fixed axis of the valve housing. A characteristic of this type of handle motion is that when the handle is rocked to an off position, the mix ratio of hot and cold water can be remembered by the angular location of the handle about the fixed axis so that when the faucet is turned back on, one has the option of obtaining the same mix of hot and cold water flows through the faucet regardless of the flow amount. The fixed axis is most commonly found to be vertically oriented.

Recently, ball valves have been devised that allow the handle to be operated in the same fashion as the above described plate type mixing valves. The ball valve is disclosed in U.S. Pat. No. 4,449,551 issued to Lorch on May 22, 1984. Another system is disclosed in PCT application PCT/US91/07816 filed on Oct. 22, 1991 by the present applicant and the disclosed structure and operation is incorporated herein by reference.

There are also commercially available faucets which incorporate devices that prevent the faucet from either being adjusted to provide excessively hot mixture of water for reasons of economy, safety, or conservation of heating fuel. Furthermore, devices have also been incorporated to prevent excessive flow for reasons of economy or conservation of water.

Known devices intended to impede or obstruct motion exceeding a certain limit can be classified into four types. In the first type of device, there is a restrictor that is fixedly mounted in the flow passage to choke or restrict the flow of water therethrough. This type of device precludes the ability to obtain a flow rate that is greater than the imposed limit of the restrictor without physical disassembly of either the faucet or piping upstream from the faucet.

The second type of device includes a stop built into the faucet such as a stop shoulder in the form of a lobe or screw that provides a stop limit in the faucet. If the maximum capacity can be adjusted as in the case of the screw, the faucet handle needs to be disassembled to reach access to the adjustment screw. These first two classes of flow restrictors tend to positively impede the user from overriding the imposed limit. Any adjustment to the stop limit is infrequently done and is usually done to permanently change the stop position of the faucet.

Two other classes of restrictors provide for a convenient override of the preset limit which only dissuades the user from obtaining adjustment above a predetermined limit. The third class of restrictors has a limit stop which has a push button that when pressed allows the handle to operate beyond the predetermined limit. In normal use, the operator normally operates the faucet normally below the predetermined limit without pressing the button, but upon occasion can push the button to allow the faucet to be adjusted beyond the predetermined limit. The disadvantage of this class of flow restriction is the expense in the complex construction and the consequent high cost. Furthermore, the push button must be manually pushed each time the faucet is adjusted beyond the preset limit. The action of pushing the button can be inconvenient because it is obtained by different movement or actions than the movement or actions that control adjustment of the flow and temperature mix of the mixing valve.

The fourth class of flow restrictor is a spring type device which repels the control member when the control member is opened beyond the closed position. During operation of a valve with this type of flow restrictor, the control member is manually moved and held in place against the biasing force of a spring. Upon release of the handle, the handle is resiliently moved back to a position such as the closed position by the biasing force of the spring acting against the opening action of the valve. The inconvenience in this type of device is that the operator must manually keep the handle pressed beyond the preset position the entire time the increased flow rate is desired. Devices of this type are often incorporated to provide automatically closing faucets.

Modern single handle mixing valves have been developed with easier and more consistent operating parameters. The mixing valve can be quickly operated from a closed position to an open position and quickly moved in the opposite fashion, from a full open position to a closed or off position. Furthermore, the operating force needed to operate modern faucets is substantially constant throughout the full operating range of the valve either during adjustment of the flow or temperature mix.

Usually, the force needed is low to allow ease of operation of the faucet controls. For example, children and physically handicapped people require smooth operating faucets. Furthermore, a smoothly operating faucet is a commercial necessity. One drawback arises from the low operating forces that provide ease of control of modern faucets. The small operating force allows for quick movement of the control stem. Quick movement from the open to the fully closed position can lead to an abrupt cessation of flow of water and thus lead to the undesirable symptom often referred to as hammer knock.

Anti-knock devices have been incorporated in pipe lines for water flow. These often are in the form of an extra dead end head section joined to the normal pipe leading to the mixing faucet. The dead end pipe section is filled with air that compresses when flow is abruptly stopped in the pipe. However, not all piping incorporates the extra head section.

What is need is a flow restrictor device which provides for a preset flow capacity but allows for an easily operated override of the preset amount when desired without introducing different actions or motions that are used to adjust the flow or temperature mix of the mixing valve and simultaneously provides for limiting the speed with which the flow is ceased in the pipe so as to prevent hammer knock. What is also needed is a faucet that has a mechanism that provides for greater minimum operating force for a predetermined part of the range of the faucet valve operation.

SUMMARY OF THE DISCLOSURE

In accordance with one aspect of the invention, a mixing valve for a faucet has a housing with a valve chamber, first and second supply inlet ports and a supply outlet port in communication with the valve chamber. A movable mixing valve section includes a movable valve element operably mounted in the valve chamber and a control stem extending from the movable valve element through an opening in the housing to control both flow and temperature mix of the water through the ports. The control stem is movable in one direction to control the flow of liquid through the supply outlet port and is movable in a second direction to control the mixing ratio of water from the first and second supply inlet ports to provide temperature adjustment. The control stem is operably movable upon the exertion of a first predetermined operating force thereupon. A wall section is mounted in proximity of the movable valve section.

Either the movable valve section or the wall section houses a resiliently biased projection that is normally disengaged from the other of the movable valve section and wall section. The projection is laterally engageable with the other of the movable valve section and wall section when the valve section is moved to a preset flow position such that the control stem is operably movable upon the exertion of a second predetermined operating force thereupon that is greater than the first predetermined operating force at the preset position. The projection is resiliently biased in a direction substantially perpendicular to the motion of the moving valve section that is engaged with the projection to allow the moving valve section to operate beyond the preset position.

The faucet mixing valve preferably has the projection mounted in the wall section and is engageable with the control stem of the movable valve section. Preferably, the control stem is constructed and mounted in the faucet housing such that it rotates about a fixed axis to regulate the temperature mix and that it has a rocking motion about an movable axis orthogonal to both said longitudinal axis of said stem and said fixed axis pivots to adjust the flow.

The movable valve section may be either a ball valve element or may be a plate valve element. In either embodiment, the movable valve section is operable by a single control stem to control both the temperature mix ratio and the flow.

In one embodiment, the projection is constructed and positioned to be engaged with the control stem when the control stem obtains a position corresponding to a predetermined flow and is overcome to provide greater flow upon exertion by the operator of the greater second predetermined force.

In one embodiment, a u-shaped spring element has first and second arms forming a slotted interior opening therebetween. The spring element is mounted about the control stem and is rotatable with respect to the housing about the fixed axis to follow the rotational movement of the control stem but is affixed against rocking motion of said control stem. The projection is integrally formed with a distal end of one of the first and second arms of the u-shaped spring element that is mounted about the control stem such that the interior opening of the spring allows lateral rocking movement of the control stem therein for controlling the flow. The projection is abutted by the control stem at a preset rocking position to flex the one arm of said u-shaped spring to resiliently flex the spring and provide the second greater minimum operating force of the control stem during the flexing of the spring. The second greater minimum force is felt by the operator as an increased resistance and indicates the desired normal maximum flow capacity during normal use of the faucet.

In another embodiment, the projection is constructed and positioned to be engaged with the control stem when the control stem obtains a position corresponding to a low predetermined flow and is overcome to be further moved to the closed position upon exertion by the operator of the greater second predetermined force. The providing of the greater minimum operating force tends to slow down the speed of the valve closing motion sufficiently to prevent hammer knock.

Desirably, the spring has the first and second arms with respective first opposing sections spaced apart a predetermined distance, and respective second opposing sections spaced apart a smaller distance than the predetermined distance, the smaller distance being smaller than the width of the control stem such that the spring flexes when the control stem is interposed within the second opposing section.

The first and second arms of the spring may have respective third opposing sections spaced apart a smaller distance than the predetermined distance, the smaller distance being smaller than the width of the control stem. The first opposing sections are interposed between the respective second and third opposing sections. In this embodiment, the faucet is provided with both an anti-knock device and an indication to the operator of the desired normal maximum flow capacity during normal use of the faucet.

In one embodiment, the wall is a removable plate member and the projection is resiliently mounted in an asymmetrical position within the plate member such that the plate member can be mounted in a choice of a first position and a second different position to provide a selection of at least two preset positions wherein the control stem engages the projection. The plate member may be an elastomeric member.

According to a broader aspect of the invention, a wall section is mounted in proximity of the movable valve section. One of the movable valve section and wall section houses a resiliently biased projection that is normally disengaged from the other of the movable valve section and wall section and is laterally engageable with the other of the movable valve section and wall section when the movable valve section is moved in a selected one of the first and second moving directions of the movable valve element to a preset position such that the control stem is operably movable upon the exertion of a second predetermined operating force thereupon that is greater than the first predetermined operating force. The projection is resiliently biased in a direction substantially perpendicular to the motion of said moving valve section at the location of the moving valve section where it engages the projection to allow the moving valve section to operate beyond the preset position.

BRIEF DESCRIPTION OF THE DRAWINGS

Reference now is made to the accompanying drawings in which:

FIG. 3 is an enlarged cross-sectional view taken along lines 3—3 shown in FIG. 2;

FIG. 4 is a cross-sectional view taken along lines 4—4 shown in FIG. 3;

FIG. 5 illustrates a modification of the spring clip illustrated in FIG. 4;

FIG. 6 illustrates another modification of the spring clip illustrated in FIG. 4;

FIG. 10 is a view similar to FIG. 3 illustrating another modification of the invention;

FIG. 11 is a fragmentary cross sectional view taken along lines 11—11 shown in FIG. 10 illustrating another embodiment of the invention;

FIG. 12 is a view similar to FIG. 11 illustrating a further modification of the invention;

FIG. 13 is a view similar to FIG. 12 illustrating a further modification of the invention;

FIG. 14 is a view of the elastomeric element shown in FIG. 13 rotated to a different position;

FIG. 15 is a view similar to FIG. 13 illustrating a further modification of the invention;

FIG. 16 is a view of the insert shown in FIG. 15 rotated to a different position;

DETAILED DESCRIPTION OF THE PREFERRED EMBODIMENT

Figure 1:
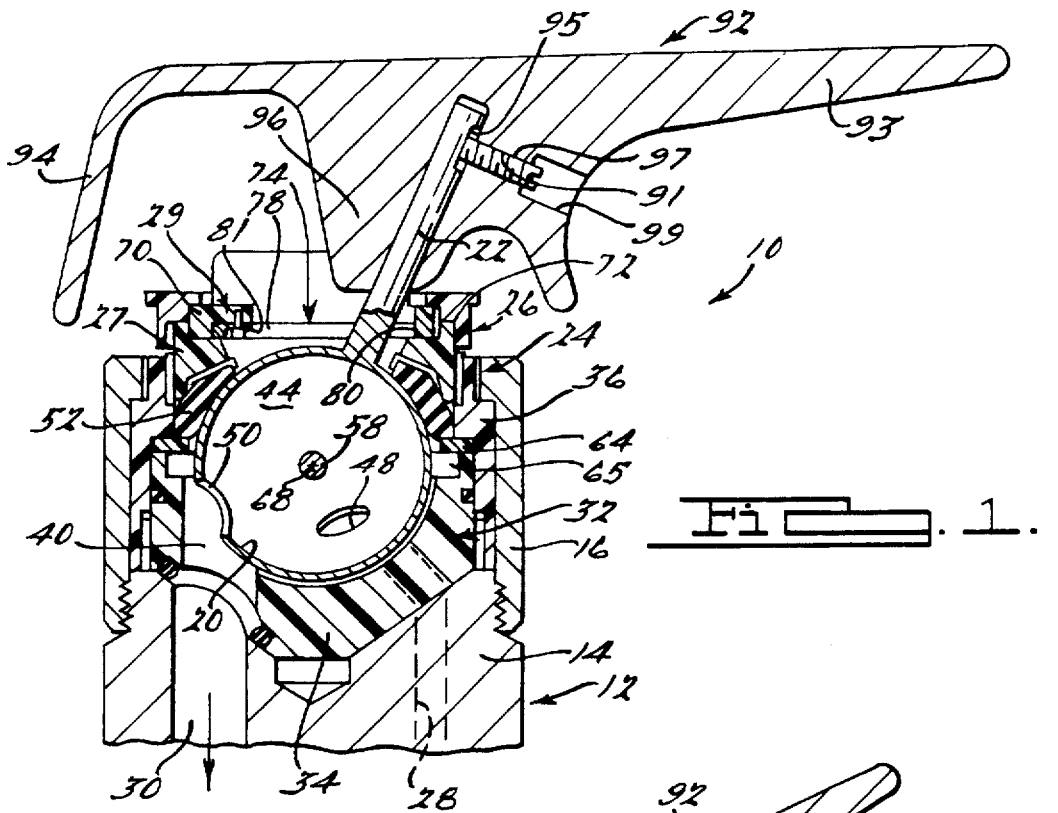
FIG. 1 is a side elevational and segmented view of a faucet mixer valve according to one embodiment of the invention illustrating the faucet in the off position.
Figure 2:
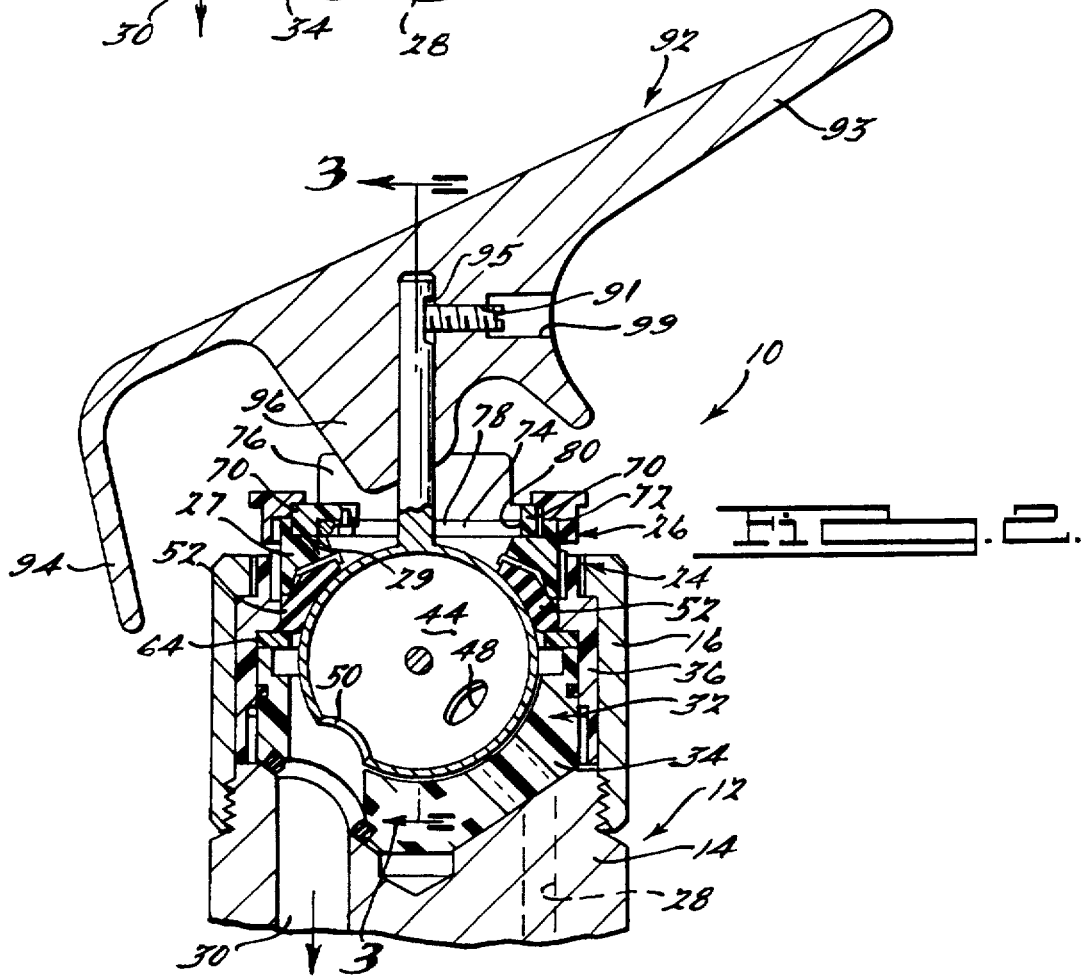
FIG. 2 is a view similar to FIG. 1 illustrating the movable valve in a partially open position.

Referring now to the FIG. 1 and 2, a mixing valve 10 has a conventional valve housing 12 that is formed from a housing base member 14 and a cover 16, A ball valve element 20 with a control stem 22 extends through an opening 24 in the cover 16. A ring assembly 26 is mounted on top of fixed member 27 to provide mounting of a force controlling device 29 as described in more detail.

More particularly, the housing base member 14 has two inlet ports 28 (one shown in phantom for simplicity of the drawings) for hot and cold water and an outlet port 30 for the passage of mixed water. The illustrated mixing valve 10 is a cartridge type having a cartridge housing 32 fitted within the housing 12. The cartridge housing 32 includes a lower body member 34 and upper body member 36 that are fitted together in a known fashion. The lower body member 34 has two inlet passages 38 that house respective conventional sealing assemblies (not shown for simplicity of the drawing) and aligned with inlet ports 28. An outlet passage 40 is aligned with outlet port 30.

The cartridge housing 32 defines a cavity 44 shaped to receive the ball valve element 20. The ball valve 20 is seated in cavity 44 that is substantially spherical. The ball valve 20 has ports 48 and 50 that functionally cooperate with passages 38 and 40 to control flow rate and temperature of water passing to outlet port 30. A sealing gasket 52 is sealingly interposed between an upper part of the ball valve 20 and cartridge upper body member 36 to prevent leakage of water from the mixing valve 10 to outside of the housing 12. The sealing gasket 52 is positioned in place by an adjustment ring member 27 screwed into upper body member 36.

As more clearly shown in FIG. 3, the ball valve 20 has a pin 58 extending therethrough with distal ends 60 extending into a slot 62 defined below a guide ring 64 which form a guide mechanism 65. The details of the function of the guide mechanism 65 with pin 58 is explained in PCT application PCT/US91/07816 filed on Oct. 22, 1991 by the present applicant and is incorporated herein by reference. Generally, the guide mechanism 65 allows orbiting motion of the control, stem about a fixed vertical axis 66 and rocking motion of the stem about a horizontal axis 68 through the pin 58. The axis 68 is movable with respect to the housing 12 but fixed with respect to the ball valve 20. The axis 66 extends through opening 24 and cavity 44 in housing 12. Motion in a direction other that these two prescribed directions is prohibited by the construction of the internal members of the mixing valve 10. The pin 58, guide ring 64, and cartridge lower body member 34 are constructed to be strong enough to resist lateral torquing forces in directions other than the prescribed directions.

The rotatable ring 26 assembly includes a plate member or disc 70 that is rotatably mounted on top of the outer end 72 of adjustment ring 27 about vertical axis 66. As shown in FIGS. 1 and 3, the disc 70 has an elongated slot 74 therethrough with side edges 78 and two opposite end edges 80 and 81. The disc 70 is retained on adjustment ring 27 by a positioning ring 82 that is engaged to an outer upper periphery 84, of adjustment ring 27. The construction and assembly of ring 82 and disc 70 and adjustment ring 27 is described in detail in co-pending application PCT/US92/05977 and is incorporated herein by reference.

In brief, referring to FIG. 4, the outer periphery of adjustment ring 27 has an externally splined section 91 that engages an internally splined section 90 of ring 82. The adjustment of the ring 82 varies the amount of rotation of the disc 70 and ball valve 20 between a full cold position defined by guide mechanism 65 and a full hot position.

An operating handle 92 is affixed to control stem 22 to operate the ball valve 20. The handle 92 has a lever section 93, cap section 94 and a leg section 96 that connects to stem 22. The leg section 96 has a substantially rectangular outer cross-section sized to fit within slot 74 with two sides 98 in close proximity to flanges 76 to provide rotation of disc with the rotation of handle 92 about axis 66.

The stem 22 may have a flat 95 machined therein that is aligned with a threaded aperture 97 in leg section 96 that receives set screw 91. Cap section 94 may have an access hole 99 to facilitate operation of set screw 91.

It can be seen that the spacing of ends 80 and 81 of slot 78 controls the amount of rocking motion of stem 22 that can exist from the off position adjacent end 80 to a full open or maximum flow position adjacent end 81.

Referring now to FIGS. 3 and 4, a U-shaped spring 100 is mounted within a recess 101 axially aligned with slot 74 in rotatable disc 70. The U-shaped spring 100 has two resilient arms 102 that extend from a bight section 104. The bight section 104 has a mounting flat 106 that receives a screw 108 that screws into disc 70 to affix the spring to the disc 70. The two arms 102 have normally parallel distal sections 110 that are spaced apart such that it abuts the sides of control stem 22. The distal ends 110 may laterally abut shoulders 103 on disc 70.

When the control stem 22 is laterally moved along the space 112 between the sections 110, a first operating force is needed to overcome inherent friction, of the faucet in order to move the handle 92 and stem 22 to operate and pivot the movable valve element about the horizontal axis 68 to control the total flow output. A similar operating force is needed to rotate the ball valve about vertical axis 66 to control the temperature mix.

The spring arms 102 each have an inward projection 114 which forms a space 116 therebetween that is normally smaller than the diameter of stem 22 such that upon motion of the control stem to the position shown in FIG. 4 which corresponds to a preset total flow, a greater force is needed to overcome the spring bias of the arms 102 to flex them outwardly and allow the stem to proceed to be moved toward end 81 of slot 78. The flexing of the arms 102 is in a direction substantially perpendicular to the motion of the stem 22 against the projections 114. The flexing of the arms 102 provides for an relatively quick increase in operating force that is felt by the operator as an indication that the normal maximum flow capacity is at this handle position.

An operator uses normal operating motion to move handle 92 to adjust flow. When the operator moves the control stem to the position as shown in FIG. 4, and still desires an further increase in flow, he uses the same adjusting motion but with a substantial increase in exertion. No motion different from the regular flow adjusting motions are needed to override the normal maximum flow capacity which provides for a convenient override.

Figure 17:
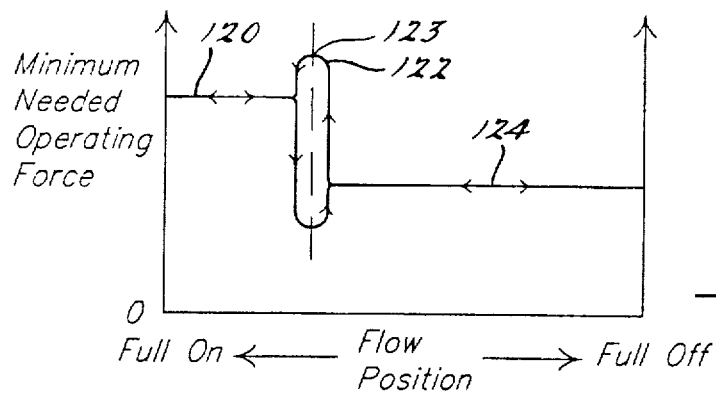
FIG. 17 is a schematic graph illustrating the needed operating force of the faucet relative to its operating flow position of the embodiment illustrated in FIG. 4.

Once the arms 102 are flexed outwardly, the proximate sections 115 of the arms are substantially parallel. When the stem 22 is moved beyond the projections 114, the parallel sections 115 provide for no closing or opening biasing force onto the stem 22 but only an increased friction onto the stem 22. The stem 22 will remain in the section 116 between arms 110. FIG. 17 illustrates the operating force schematically graphed against the flow position of the mixing valve for spring 100. The minimum operating force for the faucet is indicated by section 124 of the curve. The force needed to flex the spring 100 is indicated by section 122 which has a peak at 123. The rate of change caused by flexing projections 114 is relatively great as indicated by the near vertical slope of section 122. The force beyond the preset flow caused by the increased friction due to arm sections 115 is substantially constant and greater, as indicated by section 120 of the curve.

It is readily observed that when the control stem is only adjusted about vertical axis 66, the spring 100 has no dynamic effect on the stem 22. The spring rotates with the disc 70 to remain stationary with stem 22 as is rotates about axis 66.

In a second embodiment illustrated in FIG. 5, U-shaped spring 200 is mounted in the same fashion as spring 100. The contour of the arms 202 however is different and provides for a different advantage as described. The U-shaped spring 200 has two arms 202 that extent from a bight section 204. The bight section 204 has a mounting flat 206 that receives a screw 208 that screws into disc 70 to secure the spring in place to the disc 70. The proximate arm sections 215 are spaced further apart than distal arm sections 210. Inwardly extending projection 214 abuts control stem 22 at a preset flow which is substantially closer to the off position that the projections 114 disclosed in the first embodiment. The distal arm sections 210 are normally spaced closer than the width of stem 22. When the arms 202 are flexed outwardly by stem 22, the sections 210 are parallel.

Figure 18:
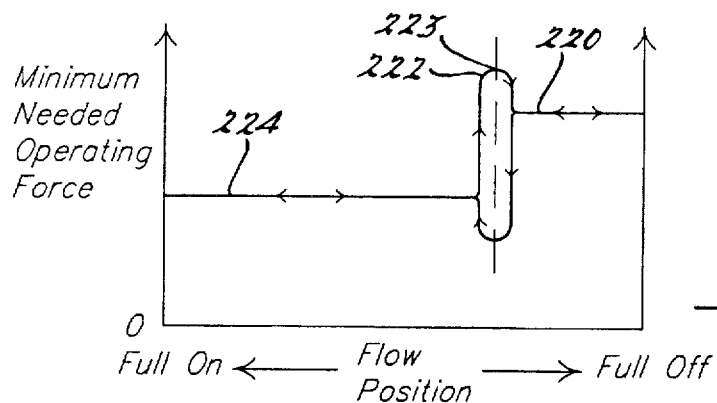
FIG. 18 is a schematic graph illustrating the needed operating force of the faucet relative to its operating flow position of the embodiment illustrated in FIG. 5.

FIG. 18 illustrates the operating force schematically graphed against the flow position of the mixing valve for spring 200. In operation, a first operating force is needed to close the faucet from the full on position to the position shown in FIG. 5, which corresponds to a preset flow as indicated by section 224 of the curve shown in FIG. 18. A greater force is needed to overcome the spring bias of the arms 202 to flex them outwardly and allow the stem to proceed to be moved toward end 80 of slot 78. This increase is shown in FIG. 18 as section 222 of the curve which peaks at 223.

Once the arms 210 are flexed outwardly, the distal sections 210 of the arms are substantially parallel. When the stem 22 is moved beyond the projections 214, the parallel sections 210 provide for no closing or opening biasing force onto the stem 22 but only an increased friction onto the stem 22. The increase in friction provides for a continued increased and relatively constant operating force that illustrated as section 220 of the curve.

It is common that when a operator controls a mixing valve, the operator exerts approximately a constant force onto the handle. Since speed or velocity of the handle and ball valve is closely related to the applied force, the increased needed operating force needed to close the faucet during motion of the stem within section 212 translates into a slower motion of the control stem 22 and mixing valve as it is moved by the operator's near constant applied force from the position shown in FIG. 5 to the full off position. The increased time for shutting off the valve provided by the slower motion of the ball valve greatly reduces the risk of hammer knock.

The function and advantage of the spring clips 100 and 200 may be combined into a single unit as illustrated in FIG. 6. Spring 300 is mounted in the same fashion as either spring 100 or 200. The U-shaped spring 300 has two arms 302 that extent from a bight section 304. The bight section 304 has a mounting flat 306 that receives a screw 308 that screws into disc 70 to secure the spring in place to the disc 70. The two arms 302 have normally parallel mid sections 310 that are spaced apart such that they abuts the sides of control stem 22.

When the control stem 22 is laterally moved along the space 312 between the mid-sections 310, a first operating force is needed to overcome inherent friction of the faucet and move the handle 92 and stem 22 to operate and pivot the movable valve element about the horizontal axis 68 to control the total flow output.

The spring arms 302 each have an inwardly extending projection 314 which forms a space 316 there-between that is normally smaller than the diameter of stem 22 such that upon motion of the control stem to the position shown in FIG. 6 which corresponds to a preset total flow, a greater force is needed to overcome the spring bias of the arms 302 to flex them outwardly and allow the stem to proceed to be moved toward the full slow position. The projections 314 and proximate sections 315 of spring 300 functions in that same fashion as projections 114 and proximate sections 115 illustrated in FIG. 4.

Inwardly extending projections 324 abut control stem 22 at a preset flow which is substantially closer to the off position that the projections 314. The distal arm sections 320 are normally spaced closer than the width of stem 22. The structure and function of projections 324 and distal sections 320 are substantially identical to the projections 214 and distal sections 210 illustrated in FIG. 5.

Figure 19:
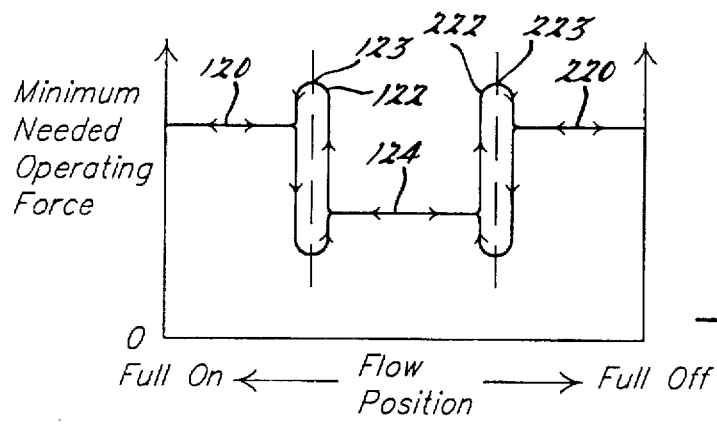
FIG. 19 is a schematic graph illustrating the needed operating force of the faucet relative to its operating flow position of the embodiment illustrated in FIG. 6.

The spring 300 provides for increased operating force for above a preset amount of flow and also reduces the risk of hammer knock upon closure of the valve FIG. 19 illustrates the minimum necessary operating force schematically graphed against the flow position of the mixing valve for spring 300. FIG. 19 shows the needed forces, as previously described, for FIGS. 17 and 18.

Figure 7:
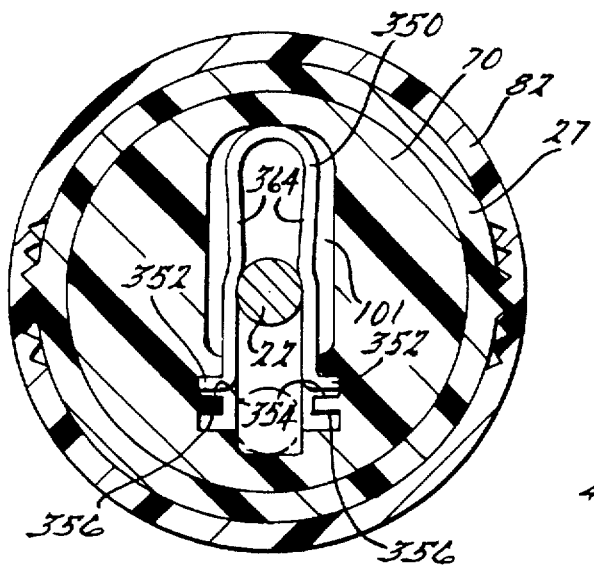
FIG. 7 is a view similar to FIG. 4 illustrating a further modification of the spring clip.

FIG. 7 illustrates a modified spring 350 which provides the same function as the spring 100 illustrated in FIG. 4. Instead of being mounted by a screw as the above described embodiments, the spring 350 has inwardly extending projections 364. The spring 350 also has two outwardly extending flanges 352 that can be snap fitted into corresponding recesses 354 or a second set of recesses 356. In this fashion, the spring 350 can be axially adjusted to shift the preset flow position where the control stem 22 flexes the spring 352. In this way, a selection of two preset flow rates is available with use of the same spring.

Figure 8:
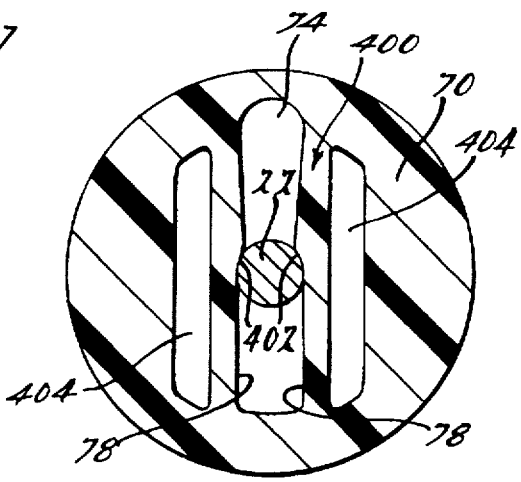
FIG. 8 illustrates another modification of the invention incorporating an elastomeric spring integrally formed with a plate device.

FIG. 8 illustrates that a metal spring clip may be substituted with an elastomeric members 400 that can be mounted about stem 22 an provide the same functions as the U-shaped spring clips described above. The elastomeric members 400 may be integrally formed with disc 70. The members 400 are wall sections each having an opposing inward projections 402 extending toward each other. Each wall section 400 has space 404 located behind it to allow the members 400 to flex outwardly when the stem 22 is moved to a position to engage the projections 402. The wall sections 400 may also define the side walls 78 of the slot 74 within disc 70.

Figure 9:
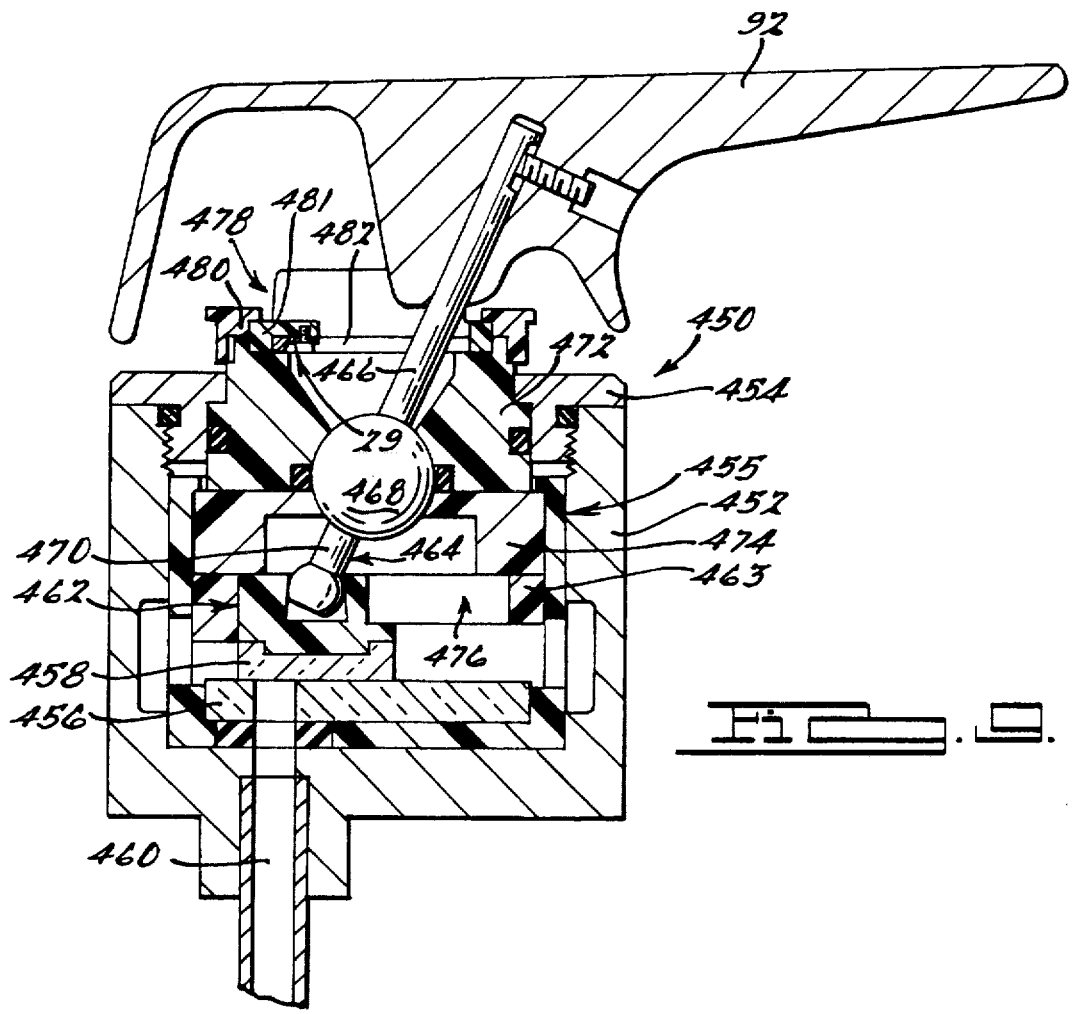
FIG. 9 is a side elevational and segmented view of a plate valve faucet incorporating an embodiment of the invention.

FIG. 9 illustrates a plate valve mixing faucet 450 comprising a housing 452 and cap 454. A valve cartridge 455 is housed within the housing 452. The cartridge contains a fixed valve plate 456 and movable valve plate 458 which cooperate with each other to regulate both the flow rate and the mixing ratio of the hot and cold water from the inlets to the outlet. For simplicity of the drawing only one inlet 460 is shown and the other inlet and outlet are not shown.

The fixed valve plate 456 and movable valve plate 458 are made from conventional hard materials, for example, polished ceramics. The movable valve plate 458 is affixed with a slide control device 462 that is driven by a control stem 464 that includes an external arm 466, ball joint 468 and internal arm 470. The ball joint 468 is retained in the cartridge 455 by operationally fixed member 472 and 474. The direction of operating motion can be defined by either an internal guide mechanism 476 incorporated between slide control device 462 and rotating ring 463 or by an external control device 478 incorporating fixed member 481 and rotating disc 480 with slot 482 that engage a non-circular cross-sectional area of arm 466. The handle 92 is conventionally mounted to the external arm 466. The structure described so far is conventional for faucets incorporating ceramic plate valves and therefore further detail is not required.

Furthermore, the motion of handle 92 is conventional, being the same as for the faucet illustrated in FIG. 1. Motion about the horizontal axis 66 controls the flow and the rotation about vertical axis 66 controls the temperature mix. The handle 92 is illustrated in an off position.

The invention can incorporate the force controlling device 29 such as the u-shaped spring 100 as illustrated and above described with reference to FIG. 4 or incorporate any of the other embodiments described in connection with FIGS. 5–8.

As described above, all the embodiments illustrate the force controlling device mounted under the disc 70 so as to cooperate with the control stem 22 of the valve at an internal part of the faucet assembly. Other modifications can incorporate the projection on an external section of the faucet housing. As shown in FIG. 10, the flow control device includes a base member 500 that can be separately seated on or integrally formed with disc member 70. Base member 500 can seat spring 100, as shown in FIG. 10, or incorporate a small spring 502 mounted onto the base member 500, as shown in FIG. 11. The device includes spring 502 includes a resiliently biased projection 504 that in this case laterally engages a depending leg 506 of handle 92 that is mounted about stem 22. The increase force produced by spring 502 is substantially similar to the spring 100 described above.

FIG. 12 illustrates a base member 520 made from a resilient elastic material which incorporates a spring 522 and projection 524 integrally formed therewith. The spring 522 functions in an identical fashion as spring 502. A second spring 526 with a second projection 528 may also be integrally formed with base member 520 and function in a substantially identical fashion as spring 200 described above to reduce hammer knock.

FIG. 13 illustrates base member 530 which is houses an elastic spring member 532 that has a projection 534 mounted in an asymmetrical position thereon. Depending on whether the elastic spring 532 is mounted in a reversed or relative upside down position shown in FIG. 13 or FIG. 14, one obtains increased forces at two different preset flow amounts. For the embodiment shown in FIG. 13, leg member 506 of handle 92 may be tapered in a direction illustrated in the drawing to lessen rate of increase in the minimum necessary operating force caused by the projection 534 during the shut off motion of the control stem.

FIG. 15 illustrates another form of spring assembly which includes base member 540 housing an insert 542 that has a bearing push button 544. The button is resiliently biased by a coil spring 546 mounted in a bore 548 to bias the button to laterally engage the stem or leg 506 of handle 92. The bore 548 may be asymmetrically positioned on insert 542 such that it may be reversed to the position illustrated in FIG. 16 in a similar fashion as the embodiment shown in FIGS. 13 and 14 to provide for adjustment of the flow at which time the button engages the stem 22. The insert 542 may have a circular or polygonal peripheral shape and can be arranged in recess 550 in one of several rotated positions to allow for more widely varied applications. The insert 542 can be provided with a guide pin 552 to position it in recess 550.

Figure 21:
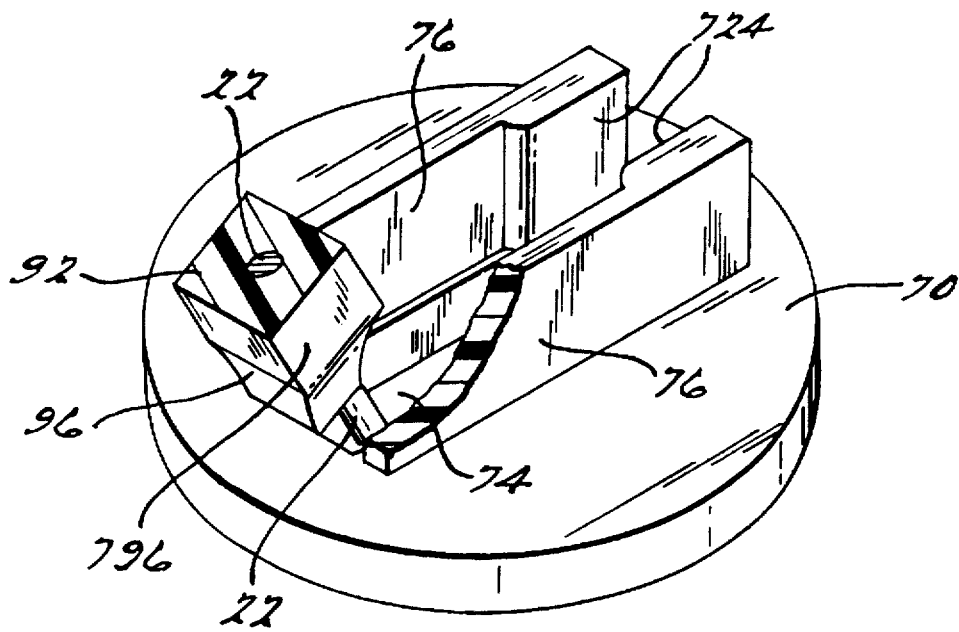
FIG. 21 is a fragmentary perspective view of a further modification of the invention.
Figure 22:
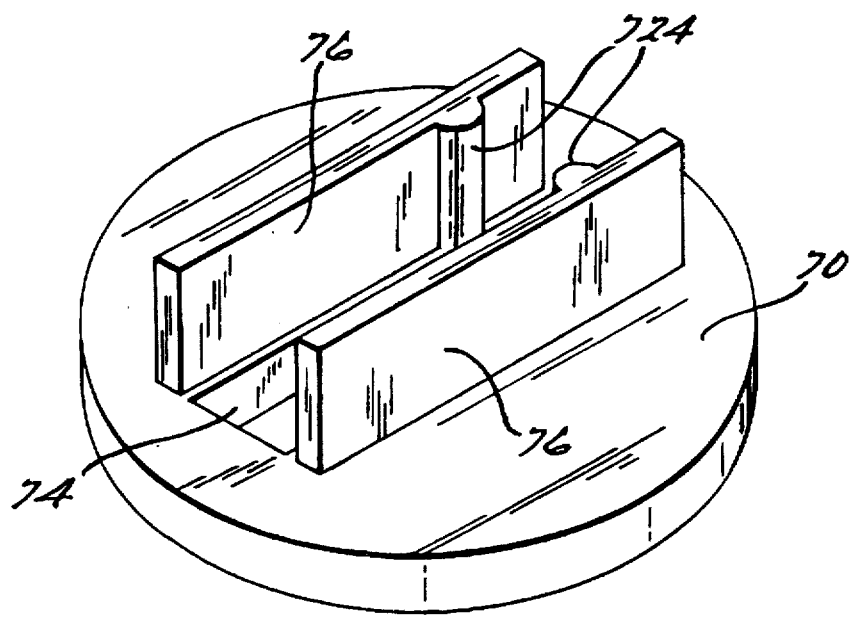
FIG. 22 is a fragmentary perspective view of a further modification of the disc shown in FIG. 21.

FIGS. 21 and 22 disclose a variation which incorporate protrusion 724 integrally formed in the inner facing surface of flanges 76 in disc member 70. The leg section 96 of handle 92 is contoured at section 796 to appropriately abut the protrusions 724 and flex the flanges 76 outwardly. The flanges 76 are resilient enough to allow for repeated flexing and return to the shown upright position, as illustrated. FIG. 21 discloses the protrusion 724 as thicker end portions of each flange 76. FIG. 22 discloses the protrusions 724 as vertical ribs interposed between the ends of flanges 76.

Figure 20:
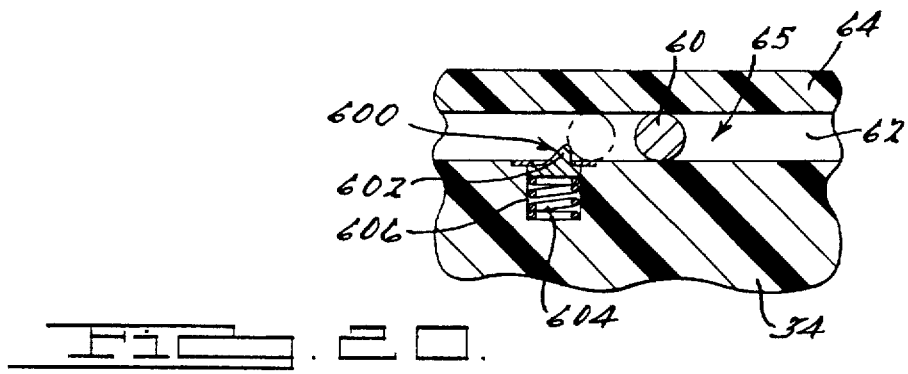
FIG. 20 is a cross-sectional view taken along lines 20—20 shown in FIG. 3 illustrating another aspect of the invention.

The mixing valve can also be constructed such that the minimum necessary operating force to operate the faucet varies upon adjusting the temperature mix of the faucet. As shown in FIG. 20, a resiliently biased projection 600 includes a button 602 and coil spring 604 mounted within bore 606 of cartridge member 34 such that the button 602 protrudes into the guide slot 62. The button is positioned along slot 66 such that upon a predetermined mix ratio, the guide pin 60 abuts and pushes the button 602 downward into bore 606 against the bias of spring 604. This action quickly increases the needed operating force and is felt by the operator to indicate the normal maximum temperature. The projection 600 is positioned along slot at the high end of the comfort zone to indicate to an operator that further adjustment beyond the projection 600 by the exertion of increased operating forces will provide hot water above the normal comfort zone.

The button may be asymmetrically tapered to allow for easier and smoother motion of the guide pin 60 from the full hot position to a colder mix position.

The motion to override the button 602 is the same motion for normal temperature adjustment but at a greater required force level. This provides for a hot-stop that is effective but can be conveniently overridden when desired by the operator.

It is also foreseen that other technical equivalents can be constructed using the teachings of this invention. For example, the ball valve 20 may alternately be mounted directly in housing 12 without a cartridge housing 32. Other variations may house the resiliently biased projection on the movable valve section which laterally engages either a rotating or fixed part of the mixing valve.

Other variations and modifications are possible without departing from the scope and spirit of the present invention as defined by the appended claims.

The embodiments in which an exclusive property or privilege is claimed are defined as follows:

1. In a faucet mixing valve having a housing with a valve chamber, first and second supply inlet ports and a supply outlet port in communication with said valve chamber, a movable mixing valve element operably mounted in said valve chamber and a control stem extending from said valve element through an opening in said housing to control liquid passing through said ports in both flow rate and temperature mix, said control stem movable in one direction to control the flow of liquid through said supply outlet port and in a second direction to control the ratio of flow through said first and second supply inlet ports, said control stem being operably movable upon the exertion of a first predetermined operating force thereupon; the improvement characterized by;

a wall section mounted in proximity to a section of said movable valve element;

one of said section of said movable valve element and said wall section housing a resiliently biased projection that is normally disengaged from the other of said valve section and wall section and being laterally engageable with the other of said valve section and wall section when the valve element is moved to a preset flow position such that the control stem is operably movable upon the exertion of a second predetermined operating force at said preset position that is greater than said first predetermined operating force;

said projection being resiliently biased in a direction substantially perpendicular to the motion of said valve section at the location of the projection engagement with the moving valve section to allow said valve section to move beyond said preset position.

2. In a faucet mixing valve as defined in claim 1 further characterized by:

said projection being mounted in said wall section and being engageable with said control stem of said movable valve element.

3. In a faucet mixing valve as defined in claim 2 further characterized by:

said control stem being constructed for rotation about a fixed axis such that said stem regulates the temperature mix and for rocking motion about an movable axis orthogonal to both said longitudinal axis of said stem and said fixed axis such that said stem adjusts the flow.

4. In a faucet mixing valve as defined in claim 3 further characterized by:

said movable valve element includes said control stem and a plate valve element.

5. In a faucet mixing valve as defined in claim 3 further characterized by:

said movable valve element includes said control stem and a ball valve element.

6. In a faucet mixing valve as defined in claim 5 further characterized by:

said projection is constructed and positioned to be engaged with said control stem when the control stem obtains a position corresponding to a predetermined flow and is overcome to provide greater flow upon exertion of said greater second predetermined force in the direction of controlling the position of said control stem.

7. In a faucet mixing valve as defined in claim 6 further characterized by:

a u-shaped spring element having first and second arms forming a slotted interior opening therebetween that is mounted about said control stem and is rotatable with respect to said housing about said fixed axis to follow the rotational movement of said control stem but being affixed against rocking motion of said control stem;

said projection being integrally formed with one of said first and second arms of said u-shaped spring element that is mounted about said control stem such that the interior opening of the spring allows lateral rocking movement of the control stem therein for controlling the flow;

said projection being abutted by said control stem at a preset rocking position to flex said one arm of said u-shaped spring to resiliently flex said spring and provide said second greater operating force of said control stem during said flexing of said spring.

8. In a faucet mixing valve as defined in claim 5 further characterized by:

said projection is constructed and positioned to be engaged with said control stem when the control stem obtains a position corresponding to a low predetermined flow and is overcome to be further moved to the closed position upon exertion by the operator of said greater second predetermined force.

9. In a faucet mixing valve as defined in claim 8 further characterized by:

a u-shaped spring element having first and second arms forming a slotted interior opening therebetween that is mounted about said control stem and is rotatable with respect to said housing about said fixed axis to follow the rotational movement of said control stem but being affixed against rocking motion of said control stem;

said projection being integrally formed with one of said first and second arms of said u-shaped spring element that is mounted about said control stem such that the interior opening of the spring allows lateral rocking movement of the control stem therein for controlling the flow;

said projection being abutted by said control stem at a preset rocking position to flex said one arm of said u-shaped spring to resiliently flex said spring and provide said second greater operating force of said control stem during said flexing of said spring.

10. In a faucet mixing valve as defined in claim 9 further characterized by:

said spring having said first and second arms with respective first opposing sections spaced apart a first predetermined distance, and respective second opposing sections spaced apart a smaller distance than said first predetermined distance, said smaller distance being smaller than the width of the control stem.

11. In a faucet mixing valve as defined in claim 10 further characterized by:

said first and second arms of said spring having respective third opposing sections spaced apart a smaller distance than said first predetermined distance, said smaller distance being smaller than the width of the control stem; and said first opposing sections being axially interposed between said second and third opposing sections.

12. In a faucet mixing valve as defined in claim 3 further characterized by:

a u-shaped spring element having first and second arms forming a slotted interior opening therebetween that is mounted about said control stem and is rotatable with respect to said housing about said fixed axis to follow the rotational movement of said control stem but being affixed against rocking motion of said control stem;

said projection being integrally formed with an end of one of said first and second arms of said u-shaped spring element that is mounted about said control stem such that the interior opening of the spring allows lateral rocking movement of the control stem therein for controlling the flow;

said projection being abutted by said control stem at a preset rocking position to flex said one arm of said u-shaped spring to resiliently flex said spring and provide said second greater operating force of said control stem during said flexing of said spring; and said projection being constructed and positioned to be engaged with said control stem when the control stem obtains a position corresponding to a low predetermined flow and is overcome to be further moved to the closed position upon exertion of said greater second predetermined force in the direction for controlling the position of said control stem.

13. In a faucet mixing valve as defined in claim 12 further characterized by:

said spring having said first and second arms with respective first opposing sections spaced apart a first predetermined distance, and respective second opposing sections spaced apart a smaller distance than said first predetermined distance, said smaller distance being smaller than the width of the control stem.

14. In a faucet mixing valve as defined in claim 13 further characterized by:

said first and second arms of said spring having respective third opposing sections spaced apart a smaller distance than said first predetermined distance, said smaller distance being smaller than the width of the control stem; and said first opposing sections being axially interposed between said second and third opposing sections.

15. In a faucet mixing valve as defined in claim 2 further characterized by:

said wall being a removable plate member;

said projection being resiliently mounted in an asymmetrical position within said plate member such that said plate member can be mounted in a choice of a first position and a second different position to provide a selection of at least two preset flow positions whereby said control stem engages said projection.

16. In a faucet mixing valve as defined in claim 2 further characterized by:

said wall being a removable elastomeric plate member;

said projection being integrally formed in an asymmetrical position with said plate member such that said plate member can be mounted in a choice of a first position and a second different position to provide a selection of one of at least two preset flow positions whereby said control stem engages said projection.

17. In a faucet mixing valve having a housing with a valve chamber, first and second supply inlet ports and a supply outlet port in communication with said valve chamber, a movable mixing valve section including a valve element operably mounted in said valve chamber and a control stem extending from said valve element through an opening in said housing to control liquid passing through said ports in both flow rate and temperature mix, said control stem movable in a first direction to control the flow of liquid through said supply outlet port and in a second direction to control the ratio of flow through said first and second supply inlet ports, said control stem being operably movable upon the exertion of a first predetermined operating force thereupon; the improvement characterized by;

a wall section mounted in proximity of said movable valve section;

one of said movable valve section and wall section housing a resiliently biased projection that is normally disengaged from the other of said movable valve section and wall section and being laterally engageable with the other of said movable valve section and wall section when the movable valve section is moved in a selected one of said first and second directions to a preset position such that the control stem is operably movable upon the exertion of a second predetermined operating force that is greater than said first predetermined operating force at said preset position in the regular direction for controlling the position of said control stem;

said projection being resiliently biased in a direction substantially perpendicular to the motion of said moving valve section at the location of the projection engagement with the moving valve section to allow said moving valve section to operate beyond said preset position.

18. In a faucet mixing valve as defined in claim 17 further characterized by:

said wall being a removable plate member;

said projection being resiliently mounted in an asymmetrical position within said plate member such that said plate member can be mounted in a choice of a first position and a second different position to provide a selection of one of at least two preset positions whereby said movable valve element engages said projection.

19. In a faucet mixing valve as defined in claim 17 further characterized by:

said wall being a removable elastomeric plate member;

said projection being integrally formed in an asymmetrical position with said plate member such that said plate member can be mounted in a choice of a first position and a second different position to provide a selection of one of at least two preset flow positions whereby said movable valve section engages said projection.

20. In a faucet mixing valve having a housing with a valve chamber, first and second supply inlet ports and a supply outlet port in communication with said valve chamber, a movable mixing valve element operably mounted in said valve chamber and a control stem extending from said valve element through an opening in said housing to control liquid passing through said ports in both flow rate and temperature mix, said control stem movable in one direction to control the flow of liquid through said supply outlet port and in a second direction to control the ratio of flow through said first and second supply inlet ports, said control stem being operably movable upon the exertion of a first predetermined operating force thereupon; the improvement characterized by;

a disc member rotatably mounted on said housing and having an elongated slot therethrough with a pair of opposing long edges and a pair of end edges defining said slot;

said elongated slot sized to receive said control stem;

a respective resilient flange extending from said disc in proximity to a respective long edge of said slot;

at least one of said flanges having an inwardly extending protrusion that is selectively operably engageable with said control stem and flexible outwardly to allow said control stem to move axially along said slot.

21. In a faucet mixing valve as defined in claim 20 further characterized by:

a handle member having a leg section affixedly mounted about said control stem with the periphery of the leg section engageable against said protrusion to flex said flange laterally outward to provide axial movement of said stem along said slot.

\* \* \* \* \*